United States Patent [19]

Yamasaki

[11] 4,352,091

[45] Sep. 28, 1982

[54] RADIO PAGER HAVING OPTIONAL ANNUNCIATING MEANS

[75] Inventor: Koji Yamasaki, Tokyo, Japan

[73] Assignee: Nippon Electric Co., Tokyo, Japan

[21] Appl. No.: 109,306

[22] Filed: Jan. 3, 1980

[30] Foreign Application Priority Data

Jan. 8, 1979 [JP] Japan .............................. 54-1026[U]

[51] Int. Cl.³ .......................... G08B 7/00; H04B 5/04; H04M 11/02

[52] U.S. Cl. .................................. 340/311.1; 455/233

[58] Field of Search ...................... 340/311.1; 367/199; 455/54, 227, 228, 230, 233, 267

[56] References Cited

U.S. PATENT DOCUMENTS 3,716,848 2/1973 Schonholtz et al. ............ 340/311.1

4,072,903 2/1978 Harris .............................. 340/311.1

*Primary Examiner*—Donald J. Yusko

*Attorney, Agent, or Firm*—Laff, Whitesel, Conte & Saret

[57] ABSTRACT

A radio paging receiver uses a receiver section for receiving and demodulating paging signals. A decoder section decodes the paging signals and a tone is generated in response thereto. When the center of slide switch is in normal position, the tone signals are rectified by a diode and applied to a speaker in order to generate subscriber alert tones. When the center of slide switch is in vibration position, the speaker does not generate any audible tones while a rectifier-integrator section is turned on to rectify and integrate the tone signals. The rectified and integrated tone signals activate a mechanical vibrator to tactilely inform the subscriber that he is being paged. The decoder section has a common output terminal for both the audible alert and the tactile vibration alert.

5 Claims, 2 Drawing Figures

RADIO PAGER HAVING OPTIONAL ANNUNCIATING MEANS

This invention relates to radio paging, receivers which not only have ordinary alert tone generating means, but also may have means for generating mechanical vibrations, either in addition to or in place of the alert tones.

Compact radio paging receivers have recently come to the extensively used in many different places and manners. Thus, it becomes increasingly difficult to adequately meet these extensive needs unless means are provided for paging by mechanical vibration in addition to alert tones.

Paging receivers in prior art more often than not use alert tones for paging. They have the disadvantage of requiring a substantial redesign of their decoder section when they are to be supplemented with paging means using mechanical vibration. Furthermore, since circuits in these compact paging receivers are integrated to a considerable extent, the redesign of their decoder section would require redesigning of their integrated circuits. Thus, it impossible for the manufacturer to respond to a customer's demand with sufficient promptness. There is another disadvantage since a provision of an additional signal output terminal, for driving the mechanical vibration elements, would entail an increase in the number of terminals required by the integrated circuits, which would prevent the reduction of receiver costs.

An object of the present invention, therefore, is to provide a radio paging receiver which enables economical addition of paging means using signals other than alert tones, without requiring either a redesign of the decoder circuit having a conventional alert tone output or any increase in number of receiver terminals.

In accordance with this invention, a radio paging receiver has: a receiver section for receiving and demodulating paging signals. A decoder section decodes the paging signals, to cause a generation of tone signals. A first terminal leads these tone signals out; to a speaker for generating alert tones. Second and third terminals provide connections for rectifying the tone signals, and are coupled between the first terminal and the speaker. Therefor a fourth terminal provides a connection to a mechanical vibrator which is also connected to the third terminal and is capable of acting in response to the output of the rectifying means. A fifth terminal provides for supplying the rectifying means with the tone signals, which act as signals. A sixth terminal provides for controlling the tone signals which are to be supplied to the speaker means and further for controlling the supplying means.

The advantages and features of the present invention will be more apparent from the detailed description hereunder, taken in conjunction with the accompanying drawings wherein.

Figure 1:
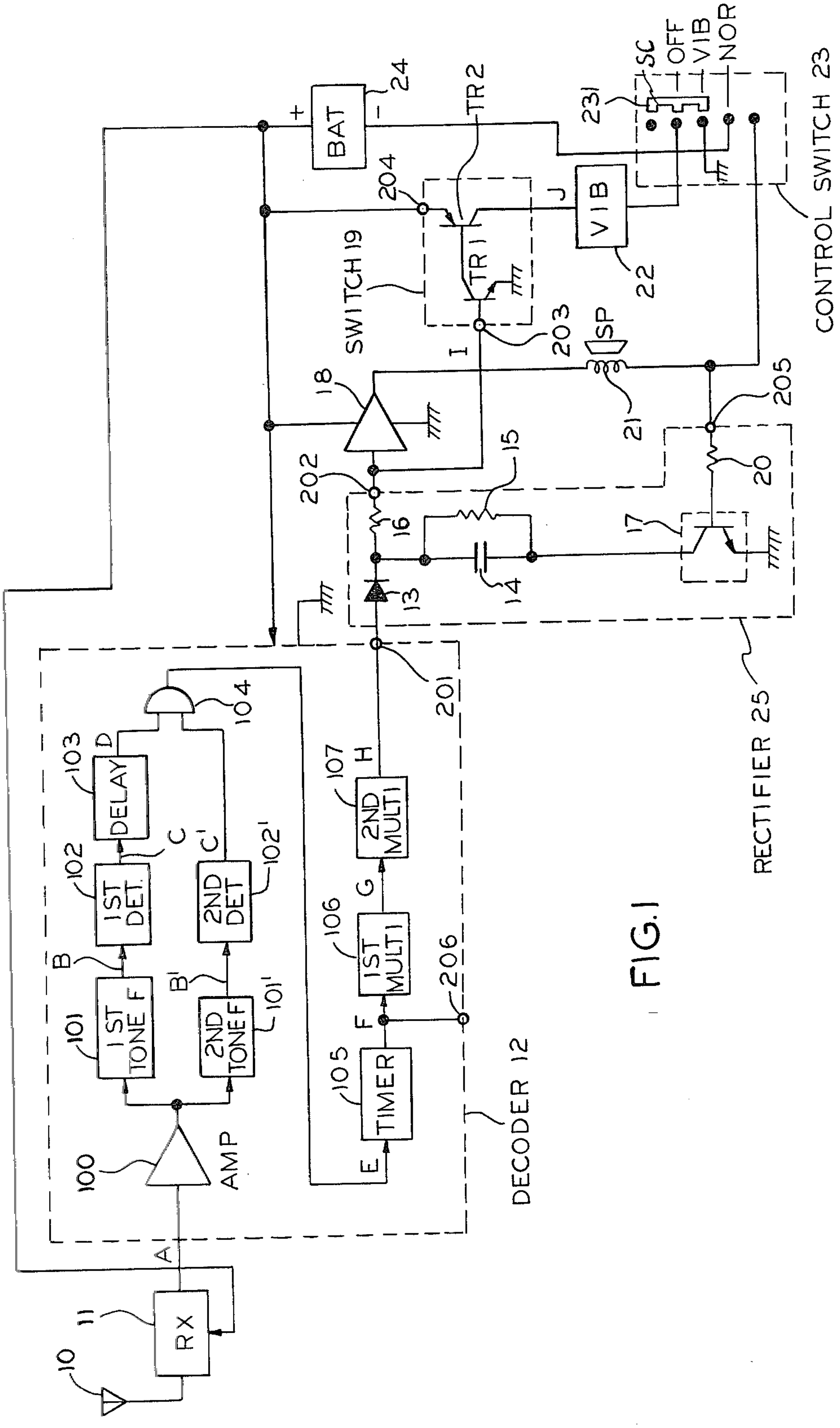
FIG. 1 is a schematic circuit diagram of one embodiment of this invention.

A carrier modulated with tone signals having a predetermined composition is received by an antenna 10 and fed to a receiver section 11. The receiver section 11, which may be a commonly used FM demodulator for instance, demodulates the signals and generates the tone signals. The tone signals are composed as shown in waveform A of FIG. 2, for example. Upon hearing the first and second tone signals, the subscriber holding the receiver knows that he is being paged.

The demodulated first and second tone signals (paging signals), after being amplified by a tone amplifier 100, are supplied to tone filters, 101 and 101' (reed filters for instance). Out of the paging signals, the filter 101 selects the first tone and the filter 101' selects the second tone. The outputs of the filters 101 and 101' are represented by waveforms B and B' (FIG. 2), respectively. The output signals B and B' of the filters are rectified by detectors 102 and 102', respectively, and converted into digital signals (represented by waveforms C and C', respectively in FIG. 2). The output C of the first tone detector 102 is delayed by a delay circuit 103 for a period equal to the transmit time of the first tone so that the rise times of the first and second tones are synchronized waveform (D in FIG. 2). An AND gate 104 uses the logical product of these signals C' and D, and turns out a signal E waveform E in FIG. 2), but only provided that the first and second signals have been received consecutively.

Figure 2:
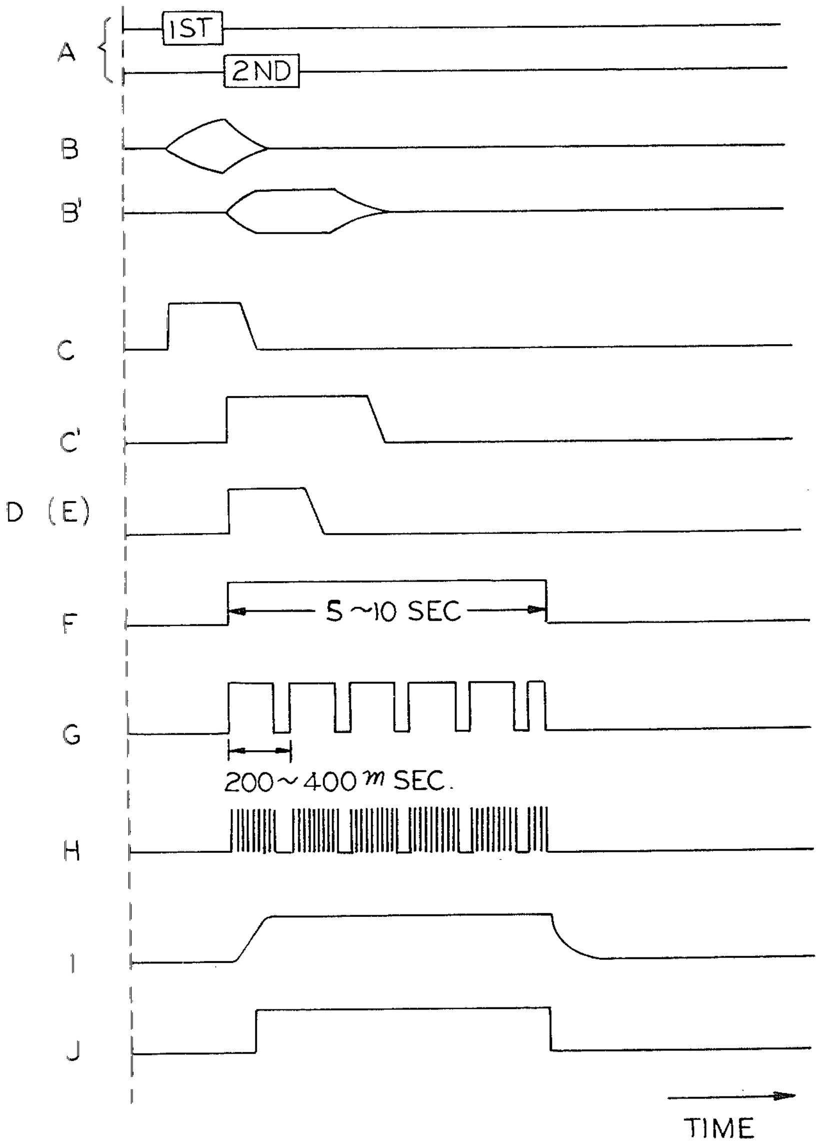
FIG. 2 shows waveforms at different points in the circuit of FIG. 1 to supplement the explanation thereof.

In response to the signal E, a timer circuit 105 gives a signal F to actuate a first self-oscillating multivibrator 106 for a certain duration (5 to 10 sec) as represented by waveform F in FIG. 2. Only when the output F of the timer circuit 105 is high, the self-oscillating multivibrator 106 supplies the next self-oscillation multivibrator 107 with a square wave G waveform (G in FIG. 2) having a certain period (200 to 400 msec). The second self-oscillation multivibrator 107 has a higher oscillating frequency (1 to 2 KHz, alert tone frequency) than the first self-oscillation multivibrator 105 has, and sends out a tone signal H, as represented by waveform H in FIG. 2, in response to the signal G.

The circuit structure so far described, from the reception and demodulation of tone signals in the decoder section 12 to obtain the tone signal (H), can be replaced with, for instance, the paging receiver invented by McGarvey (U.S. Pat. No. 3,670,242), and the tone signal detecting circuit invented by Mori et al. (U.S. Pat. No. 4,127,846). In any of these structures, the tone signal H is obtained when paging takes place, and the decoder section 12 is usually composed of integrated circuits (IC) for the sake of compactness.

The tone signal H appears at a terminal 201 and is fed to an audio amplifier 18 through a diode 13 and a resistor 16 if the central terminal SC of the slide 231 of switch 23 is in its normal position NOR. The tone signal H is amplified by the audio amplifier 18 and supplied to a speaker 21. One of the speaker terminals is grounded via the slide switch 231, and the speaker 21 generates an alert tone.

On the other hand, if the central terminal SC of the slide 231 is set in its vibrating position VIB, the tone signal H obtained from the decoder 12 is supplied to the audio amplifier 18 and to a switch circuit 19. The tone signal amplified by the audio amplifier 18 is applied to the speaker 21; however since the other terminal of the speaker 21 is not grounded via the slide switch 231, the amplified signal is impressed on a transistor switch 17 through a resistor 20. This signal turns on the switch 17. At this time, the audio signal is current-limited by a resistor 20 to prevent the speaker 21 from generating the alert tone. When the transistor switch 17 is turned on, the diode 13, a capacitor 14 and the resistor 16 constitute a integration circuit to convert the tone signal H into a certain D.C. voltage waveform (I in FIG. 2).

After being amplified by the audio amplifier 18, the rectified signal is applied to the base of the transistor switch 17 in order to keep it switched on. The lapse of time is infinitesimal from the generation of the tone signal H to the arrival at this constant state.

The integrating signal I of the tone signal is also impressed on the switch circuit 19 to turn on transistors Tr1 and Tr2. A driving voltage waveform (J in FIG. 2) from a battery 24 is impressed, through the slide switch 231, on and actuates a mechanical vibrator 22. The resulting vibration tactilely informs the holder of the paging receiver that he is being paged. As the tone signal H is terminated, the capacitor 14 ceases to be charged and the vibrator 22 is promptly stopped. A discharge resistor 15 connected to the two ends of the capacitor 14 deprives the capacitor of its stored charge. With the drop in voltage at both ends of the capacitor 14, the switch circuit 19 is turned off, and the vibration of the mechanical vibrator 22 stops.

If the mechanical vibrator 22 is to be driven without using the circuit structure of FIG. 1, the driving signal J can be obtained by actuating the switch circuit of the vibrator with the timer output signal F. In this case, however, it will be necessary to provide the decoder section 12 with an output terminal 206 for the signal F, separately from the tone signal output terminal 201. Because the decoder section 12 is more likely than not to be an integrated circuit, the optional addition of a paging function, using mechanical vibration, to an existing pager would invole an increase of IC pins or terminal in the decoder section 12 to permit the supplementation of an output terminal 206. The redesigning of integrated circuits requires enormous time and costs, and accordingly is undesirable. Incidentally, the driving circuit for the mechanical vibrator 22, rectifier and integrator section 25, switch circuit 19 and vibrator 22 in FIG. 1 are constructed to be optionally detachable from the terminals 201 through 205.

As hitherto stated, the present invention permits any existing pager, but only if it can issue a tone signal, to be readily supplemented with mechanical vibrator paging, in addition to its alert tone paging system, without requiring any remodelling of its receiver or decoder section.

What is claimed is:

1. A radio paging receiver comprising:

power supply means;

receiver means for receiving and demodulating paging signals to provide a demodulated signal;

decoder means coupled to the output of said receiver means for decoding said demodulated signal to provide a tone signal at a first output terminal;

means including an input terminal for causing a control signal to appear;

rectifier-integrator circuit means coupled to said first output terminal for rectifying said tone signal, for selectively integrating the rectified tone signals in response to said control signal, and for selectively supplying one of said rectified tone signal and the rectified and integrated tone signal to a second output terminal;

speaker means coupled between said second output terminal and said control signal input terminal for generating an audible alert tone in response to said rectified tone signal, and for supplying said rectified and integrated tone signal to said control signal input terminal, as said control signal, without any audible alert tone;

mechanical vibrator means coupled between said second output terminal and a switch terminal for producings mechanical vibration in response to said rectified and integrated tone signal; and control circuit means coupled to said control signal input terminal and said switch terminal for selectively supplying an activating voltage from said power supply means to one of said speaker means and said mechanical vibrator means.

2. A radio paging receiver as claimed in claim 1, wherein said control circuit means comprises a manual switch for selectively applying the output said power supply means to one of said control signal input terminal and said switch terminal.

3. The receiver of claim 2 wherein said decoder means comprises two parallel filter means turned to respond to two separate signal frequencies, means for converting each of said tones into a separate digital signal, means for synchronizing said digital signals, and means responsive to said synchronizing means for giving said tone signal provided that said two signal frequencies are received with a predetermined time relationship.

4. A radio paging tone receiver having at least a decoder means constructed on an integrated circuit chip having a single output terminal, said decoder means selectively responding to a radio signal including a predetermined combination frequencies which uniquely identify said paging receiver, first means responsive to an output signal from said chip for driving a loud speaker to sound an audible alert tone indicating a page, second means also responsive to said output signal from said chip for driving a vibrator to give a tactile alert signal indicating said page, and means for selecting between said first and second means, whereby either an audible or a tactile alert paging signal may be given from the same integrated circuit chip without requiring any change in the structure of said chip.

5. The receiver of claim 4 wherein said selecting means enables a switch to operate responsive to said output signal when said selecting means is positioned to select said second means, said operated switch means inhibiting said loud speaker when said output signal is present.

* * * * *